US006943362B2

(12) United States Patent
Linow

(10) Patent No.: US 6,943,362 B2
(45) Date of Patent: Sep. 13, 2005

(54) INFRARED RADIATION SOURCE

(75) Inventor: Sven Linow, Hanau (DE)

(73) Assignee: Heraeus Noblelight GmbH, Hanau (DE)

( * ) Notice: Subject to any disclaimer, the term of this patent is extended or adjusted under 35 U.S.C. 154(b) by 118 days.

(21) Appl. No.: 10/730,546

(22) Filed: Dec. 8, 2003

(65) Prior Publication Data

US 2004/0119031 A1 Jun. 24, 2004

(30) Foreign Application Priority Data

Dec. 11, 2002 (DE) .......................................... 102 58 099

(51) Int. Cl.[7] .............................. H01K 1/28; H05B 3/00
(52) U.S. Cl. .................... 250/504 R; 392/407; 392/424
(58) Field of Search ...................... 250/504 R; 392/407, 392/424

(56) References Cited

U.S. PATENT DOCUMENTS 4,271,363 A * 6/1981 Anderson ............... 250/504 R
6,018,216 A * 1/2000 McIntosh .................... 313/315

FOREIGN PATENT DOCUMENTS

| DE | 195 45 296 A1 | 6/1997 |
| DE | 199 17 270 C2 | 4/2001 |
| DE | 100 29 437 A1 | 1/2002 |
| EP | 0 464 916 B1 | 1/1992 |
| EP | 0 881 858 A2 | 12/1998 |

* cited by examiner

*Primary Examiner*—John R. Lee
*Assistant Examiner*—Paul M. Gurzo
(74) *Attorney, Agent, or Firm*—Akin Gump Strauss Hauer & Feld, LLP

(57) ABSTRACT

An infrared radiation source has a radiation-transparent, gas-tight tube made of electrically insulating material, in which a heat conductor made of carbon strip is arranged. The heat conductor has two ends, which are respectively electrically and mechanically connected to bushings made of molybdenum and/or tungsten and/or tantalum, and the bushings are respectively connected via current feed-through leads with electrical connections projecting from the tube. The two ends of the heat conductor are respectively connected to one of the bushings by a metallic solder, which contains at least one of the metals titanium, zirconium or hafnium.

17 Claims, 4 Drawing Sheets

INFRARED RADIATION SOURCE

BACKGROUND OF THE INVENTION

The invention relates to an infrared radiation source (radiator) having a radiation-transparent, gas-tight tube of electrically insulating material in which is arranged a thermal conductor made of carbon strip, having two ends which are respectively electrically and mechanically connected to bushings made of molybdenum and/or tungsten and/or tantalum, wherein the bushings are respectively connected via current feed-through leads with electrical connections projecting from the tube.

Such infrared radiation sources are known from German published patent application DE 100 29 437 A1. In particular, FIGS. 14 and 15 therein show the contacting between a carbon strip and a bushing made of molybdenum, the carbon strip having a coiled form and the bushing surrounding this carbon coil internally and externally. Graphite paper is arranged between the bushing and the carbon coil. A noble metal paste, or a metallic coating, for example made of nickel or a noble metal, applied to the ends of the carbon strip, can be arranged between the graphite paper and the carbon strip. The metallic coating on the ends of the carbon strip prevents a degeneration of the carbon material at the transition between carbon strip and graphite. However, at high temperatures in operation of the carbon strip, a diffusion of carbon from the graphite paper into the molybdenum of the bushing takes place with this kind of contacting. This leads to the formation of molybdenum carbide and consequently, at operating temperatures of the carbon strip substantially above 1300° C., to embrittlement or a break-up of the bushing, since molybdenum carbide has a higher electrical resistance, a different specific volume and also a markedly lower strength in comparison with molybdenum. The whole contact disintegrates after a few hours or weeks, depending on how high the carbon strip temperature is.

European published patent application EP 0 881 858 A2 discloses an infrared radiation source with a heat conductor made of carbon fibers. The ends of the heat conductor are electrically contacted by metallic connections, wherein contact strips made of molybdenum, among others, are used in direct contact with the heat conductor. The heat conductor can have at its ends a metallic coating, for example of gold. Furthermore, graphite paper can be arranged between the contact strips and the heat conductor, which is in direct contact with the contact strips and thus again leads to a diffusion of carbon from the graphite paper into the molybdenum and consequently to the formation of molybdenum carbide, with the problems already described above. With the connections illustrated between the contact strips and the heat conductor, it can be seen that respectively only a point or strip form pressing of the contact strip onto the heat conductor takes place. In operation of the infrared radiation source, a very high current flux exists in these regions, producing temperatures of above 1100° C. there, and accelerating the diffusion of carbon into the molybdenum. The impoverishment of the heat conductor in carbon leads to a point increase of resistance and a further temperature increase, having as a consequence the burn-up of the heat conductor.

German Patent DE 199 17 270 C2 discloses an infrared radiation source with an elongate carbon strip, which is contacted on both sides by contact pads.

European Patent EP 0 464 916 B1 discloses a high temperature-resistant composite member consisting of at least one part made of molybdenum or a molybdenum alloy and at least one part made of graphite, connected together with a zirconium solder. Between the part made of molybdenum or molybdenum alloy and the zirconium solder, a two-layer intermediate layer is arranged, which is formed of a layer of vanadium and a layer of one of the elements tungsten, tantalum, or niobium.

BRIEF SUMMARY OF THE INVENTION

The invention has as an object to provide an infrared radiation source which, at temperatures of the carbon strip substantially above about 1400° C., ensures contacting of the carbon strip with long-term durability and with outstanding electrical conductivity and mechanical strength.

The object is attained in that the two ends of the heat conductor are respectively connected to one of the bushings by a metallic solder which contains at least one of the metals titanium, zirconium, or hafnium. The solder joint between the bushing and the carbon strip forms a mechanically firm connection which conducts electricity very well and withstands the high temperatures of the carbon strip in operation for a long time.

By "carbon strip" is understood a heat conductor which is formed as follows. A strip-shaped basic structure made of carbon fibers is impregnated with a resin and subjected to a temperature treatment, which leads to the conversion of the fibers and resin into pure carbon. The thus treated basic structure is subjected to a further temperature treatment, which takes place at temperatures above the operating temperature of the carbon strip in the infrared radiation source. The crystal structure of the pretreated basic structure is thereby converted into a carbon strip with a graphite-like crystal structure which nevertheless, in contrast to graphite which is present in a macroscopically mostly disordered state, has an ordered fiber structure with covalent bonds throughout along the fiber. A markedly higher tensile strength in comparison with graphite thus arises, and has been found to be essential for use in elongate heating elements in infrared radiation sources. The expansion coefficient of the thus formed carbon strip is also smaller than that of graphite parallel to the layer, and is thus advantageous for heat conductors for infrared radiation sources. In contrast to the previously known contacting method by means of bushings, in the infrared radiation source according to the invention there is no direct contact between the bushing material and carbon strip, so that an embrittlement of the bushings by carbon alloying is avoided.

Since the carbon strip and the tube have different thermal expansion coefficients, and thus expand markedly differently over the wide temperature range between room temperature and operating temperature, the carbon strip is usually pretensioned by spring elements and kept under tension during operation of the radiation source. Particularly with large structural lengths of the infrared radiation source, considerable tensile forces then arise, which the contact regions must mechanically withstood. This is the case in an ideal manner with the soldering between carbon strip and bushing used here.

In order to prevent carbon migrating into the metallic solder or the bushing at operating temperatures of the solder joint above the solubility limit of carbon in the metallic solder, it has been found to be effective if the heat conductor is provided at both ends with a coating which has platinum and/or ruthenium and/or rhodium and/or palladium and/or osmium and/or iridium.

In particular, it has been found to be effective if the coating is formed of platinum, palladium, rhodium, or an alloy of at least two of these metals.

It is crucial for the selection of the noble metal that the solubility limit of carbon in the noble metal is above the operating temperature of the solder joint. Thus, with palladium an operating temperature of the solder joint of about 1300° C. and with platinum an operating temperature of the solder joint of about 1500° C. can be reached, without leading to a transport of carbon through the coating of noble metal.

It has furthermore been found to be effective if the bushings have a first contact layer at least on their surfaces facing the metallic solder, the first contact layer having at least one metal of the group of vanadium, niobium, or tantalum. It is particularly preferred here to form the first contact layer of tantalum. The first contact layer can then be formed either by a plated-on tantalum sheet or even by the application of a metallic paste. Current PVD (physical vapor deposition) or CVD (chemical vapor deposition) methods, such as sputtering or vaporization, are also well suited to the formation of the first contact layer.

It has furthermore been found to be effective if the bushings have a second contact layer applied on the first contact layer, the chemical composition of the first contact layer being different from that of the second contact layer. For the second contact layer, it has been found to be effective if this has at least one metal from the group of vanadium, niobium, tantalum or tungsten.

Zirconium or a zirconium alloy, because of the high melting point, has been found to be particularly effective as the metallic solder.

Besides the above-mentioned risk of carbon migration into the metallic solder, a further limiting factor for the operating temperature of the solder joint is the formation of low-melting eutectics between the metallic solder and the material of the bushing. While carbide formation results in a gradual worsening of the solder joint, which limits the lifetime of the infrared radiation source, exceeding the melting temperature of the solder joint results in a dissolution of the solder joint already within the first minutes of operation of the infrared radiation source and thus endangers its ability to function. Thus, for example, an operating temperature of the solder joint greater than about 1400° C. cannot be reached if a bushing made of molybdenum is used in direct contact with a zirconium solder, since Zr—Mo compounds have a eutectic at about 1400° C.

It has been found to be particularly effective for the bushings to be made of tantalum. A solder joint with a tantalum bushing in direct contact with a zirconium solder can be operated without problems at operating temperatures below about 1650° C. A solder joint with a tungsten bushing in direct contact with a zirconium solder can, in contrast, be operated without problems at an operating temperature below about 1550° C. Tantalum is also preferred over tungsten, because of the high specific weight and unfavorable processing properties of the latter.

It has furthermore been found to be effective for the bushings to be made of molybdenum and to be coated on their surface facing the carbon strip with a first contact layer made of tantalum or tungsten. Here, layer thicknesses of at least about 0.1 mm have been found to be effective for the first contact layer.

The tube for the infrared radiation source according to the invention is preferably formed of silica glass. In order to ensure the durability of the carbon strip at high temperatures for the longest period possible, it has been found to be effective to fill the tube with a filler gas. Here, the pressure of the filler gas is preferably about 650–850 mbar (about 650–850 hPa). In particular, the noble gases have been found to be effective as filler gases. The use of noble gases with high specific weight, such as xenon or krypton, is preferred, in order to keep the vaporization of carbon from the carbon strip low. A single noble gas or plural noble gases can be used in the tube.

It has been found to be particularly favorable for the bushings when these have surfaces large enough to be cooled by thermal radiation and convection during operation of the infrared radiation source. In particular, at very high operating temperatures of the heat conductor, it is necessary to cool the temperature at the soldered spot far enough that no melting of the metallic solder occurs, which would result in a dissolution of the contact and a consequent failure of the infrared radiation source.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
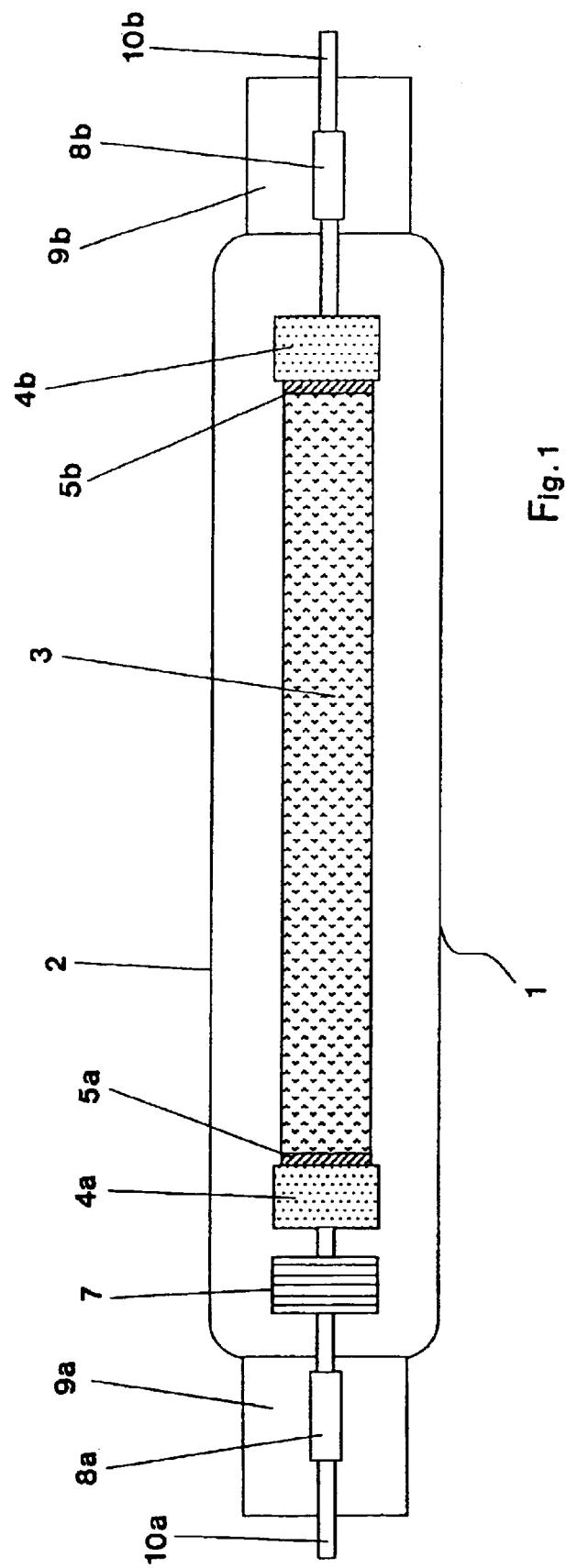
FIG. 1 is a simplified diagram of an infrared radiation source according to the invention.
Figure 2:
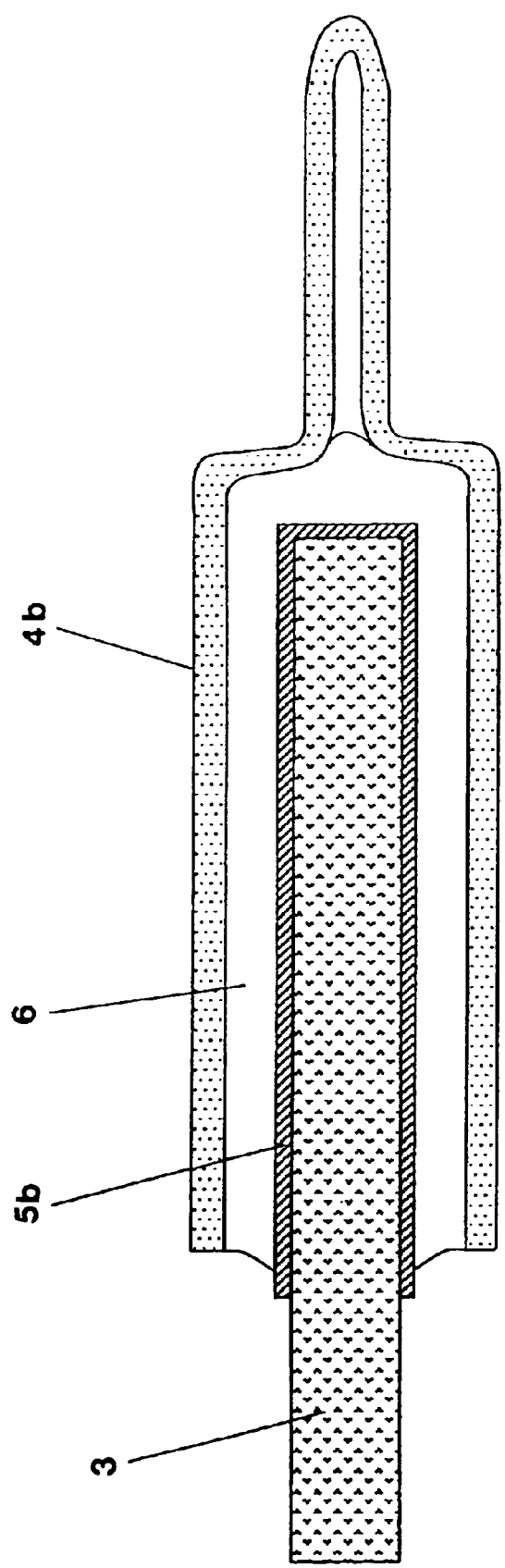
FIG. 2 is a longitudinal section through a region of the connection between the bushing and the carbon strip in the infrared radiation source of FIG. 1.

FIG. 1 shows an infrared radiation source 1 with a radiation-transparent, gas-tight tube 2 made of silica glass. A heat conductor 3 made of carbon strip is arranged inside the tube 2 and has two ends which are respectively firmly connected electrically and mechanically to bushings 4a, 4b. The two ends of the heat conductor 3 here have respective coatings 5a, 5b made of noble metal and, as can be seen in FIG. 2, are soldered to the bushings 4a, 4b with a metallic solder 6. The bushing 4a is electrically connected to a current lead-through 8a, made of molybdenum foil, by a spring element 7 for compensation of thermally caused length changes of the heat conductor 3 in operation. The current lead-through 8a is here fused gas-tight into a pinched portion 9a of the tube 2 and electrically connected to an electrical connection 10a projecting from the tube 2. The bushing 4b is directly connected electrically with a current lead-through 8b made of molybdenum foil. The current lead-through 8b is here fused gas-tight into a pinched portion of the tube 2 and electrically connected to an electrical connection 10b projecting from the tube 2.

FIG. 2 shows a possible longitudinal section through the region of the connection between bushing 4b and heat conductor 3. The heat conductor 3 here has a coating 5b of platinum and is soldered to the tantalum bushing 4b with a metallic solder 6 made of zirconium.

Figure 3:
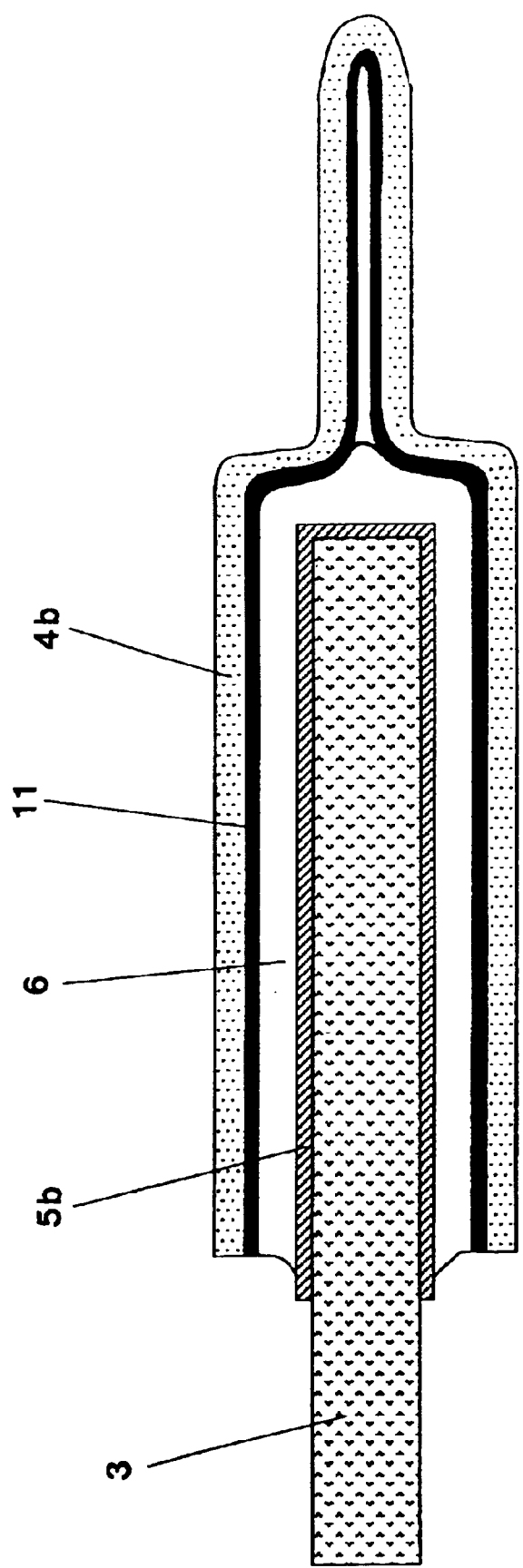
FIG. 3 is a further longitudinal section through a region of the connection between the bushing and the carbon strip according to another embodiment of the infrared radiation source of FIG. 1.

FIG. 3 shows a further possible longitudinal section through the region of the connection between bushing 4b and heat conductor 3. The heat conductor 3 here has a coating 5b of ruthenium and is soldered with a metallic solder 6 of zirconium to the molybdenum bushing 4b, which has a first contact layer 11 made of tantalum sheet.

Figure 4:
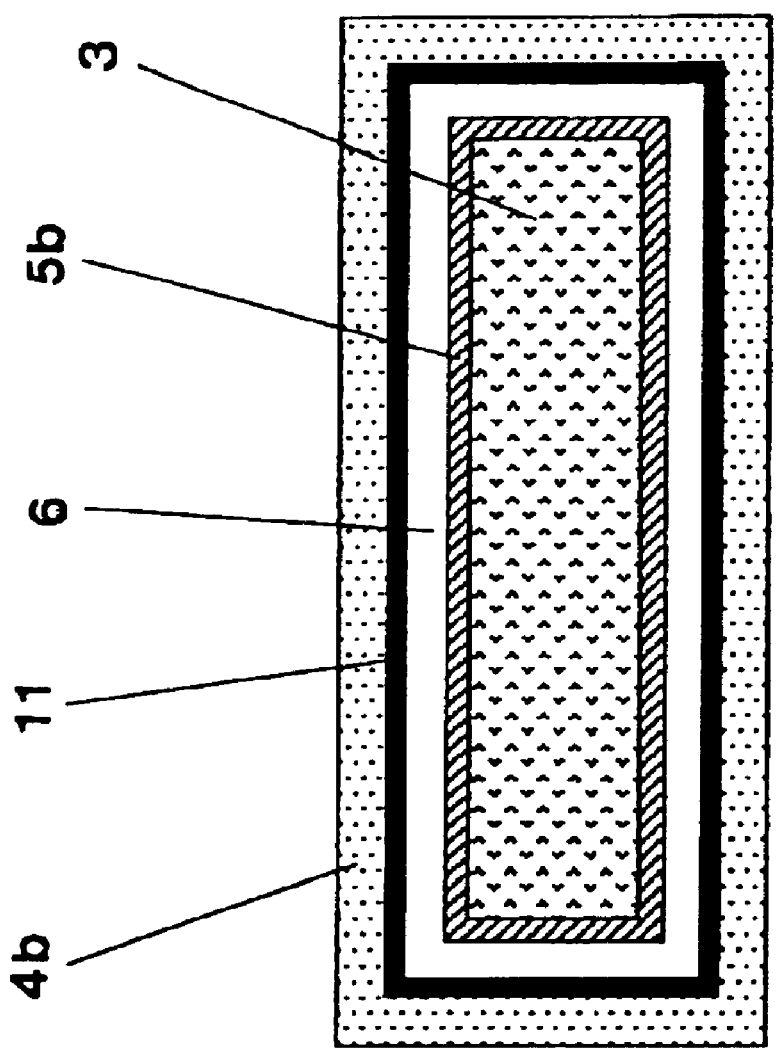
FIG. 4 is a transverse cross section through the region of the connection between the bushing and the carbon strip according to FIG. 3.

FIG. 4 shows a transverse cross section through the region of the connection between the bushing 4b and heat conductor 3 according to FIG. 3. The bushing 4b is here embodied closed on all sides, but instead slotted or laterally open bushing variants can be used, as long as the viscosity and surface tension of the metallic solder permit this when melting on.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An infrared radiation source comprising a radiation-transparent, gas-tight tube (2) of electrically insulating material, and a heat conductor (3) comprising carbon strip arranged in the tube, the heat conductor having two ends which are respectively electrically and mechanically connected to bushings (4a, 4b), wherein the bushings comprise at least one metal selected from the group consisting of molybdenum, tungsten and tantalum, the bushings being respectively connected via current feed-through leads (8a, 8b) with electrical connections (10a, 10b) projecting from the tube, and wherein the two ends of the heat conductor are respectively connected to one of the bushings by a metallic solder (6) comprising at least one metal selected from the group consisting of titanium, zirconium and hafnium.

2. The infrared radiation source according to claim 1, wherein the heat conductor (3) is respectively provided at each of its two ends with a coating (5a, 5b) comprising at least one noble metal.

3. The infrared radiation source according to claim 2, wherein the at least one noble metal is selected from the group consisting platinum, ruthenium, rhodium, palladium, osmium, iridium, and alloys thereof.

4. The infrared radiation source according to claim 3, wherein the at least one noble metal is selected from the group consisting of platinum, palladium, rhodium, and alloys of at least two of these metals.

5. The infrared radiation source according to claim 1, wherein the bushings (4a, 4b) have a first contact layer (11) at least on their surfaces facing the metallic solder (6), and wherein the first contact layer (11) comprises at least one metal selected from the group consisting of vanadium, niobium, and tantalum.

6. The infrared radiation source according to claim 5, wherein the first contact layer (11) is made of tantalum.

7. The infrared radiation source according to claim 5, wherein the bushings (4a, 4b) have a second contact layer applied to the first contact layer (11), and wherein a chemical composition of the first contact layer (11) is different from that of the second contact layer.

8. The infrared radiation source according to claim 7, wherein the second contact layer comprises at least one metal selected from the group consisting of vanadium, niobium, tantalum, and tungsten.

9. The infrared radiation source according to claim 1, wherein the metallic solder (6) is made of zirconium or an alloy thereof.

10. The infrared radiation source according to claim 1, wherein the bushings (4a, 4b) are made of tantalum.

11. The infrared radiation source according to claim 1, wherein the bushings (4a, 4b) are made of molybdenum and are coated on their surface facing the heat conductor (3) with a first contact layer (11) made of tantalum or tungsten.

12. The infrared radiation source according to claim 1, wherein the current feed-through leads (8a, 8b) are made of molybdenum.

13. The infrared radiation source according to claim 1, wherein the tube (2) is made of silica glass.

14. The infrared radiation source according to claim 1, wherein the tube (2) is filled with a filler gas.

15. The infrared radiation source according to claim 14, wherein a gas pressure of the filler gas is in a range of about 650–850 mbar (650–850 hPa).

16. The infrared radiation source according to claim 14, wherein the filler gas comprises at least one noble gas.

17. The infrared radiation source according to claim 1, wherein the bushings (4a, 4b) have a large enough outer surface to be cooled by thermal radiation or convection during operation of the infrared radiation source (1).

* * * * *